G. WAITE.
GAS COOKING STOVE AND LIKE HEATER.
APPLICATION FILED NOV. 30, 1920.
1,374,046.
Patented Apr. 5, 1921.
2 SHEETS—SHEET 1.
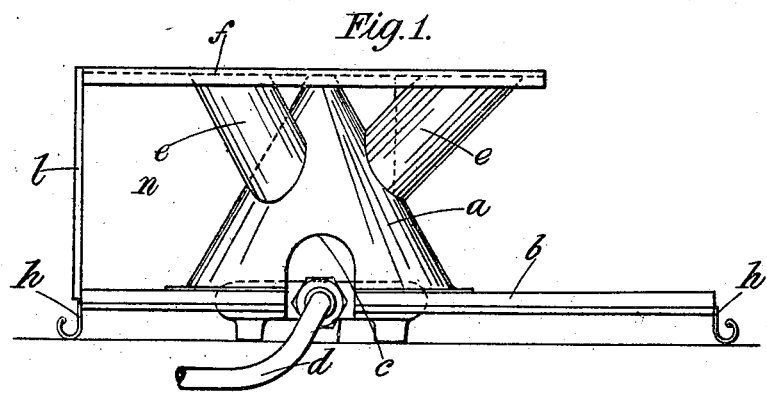
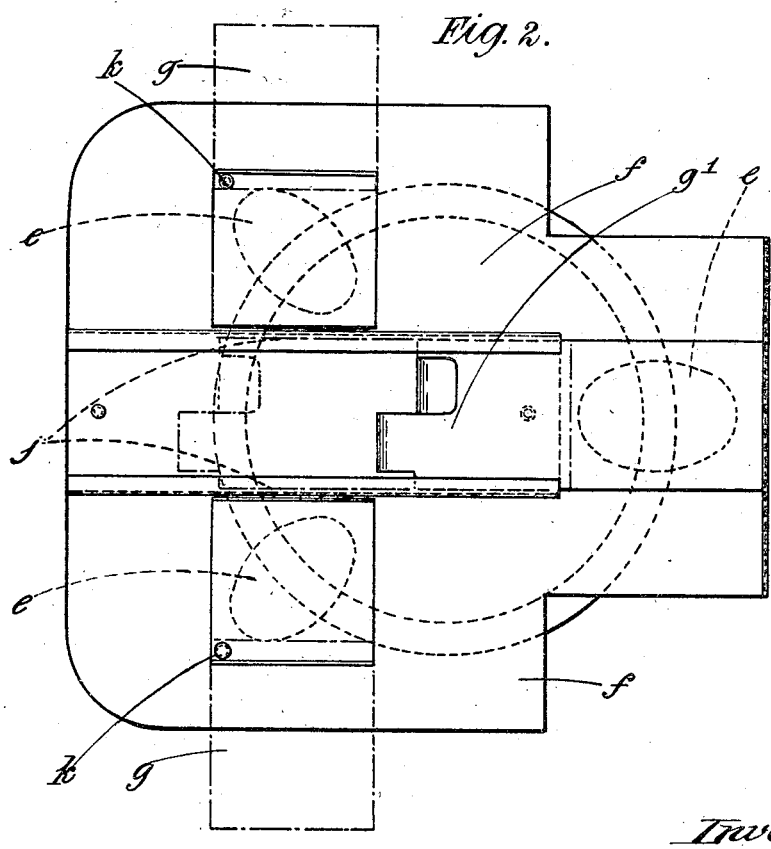
Inventor
George Waite

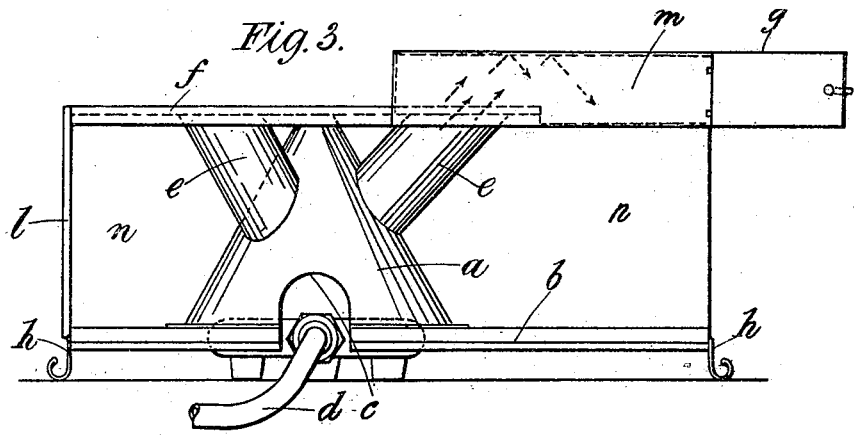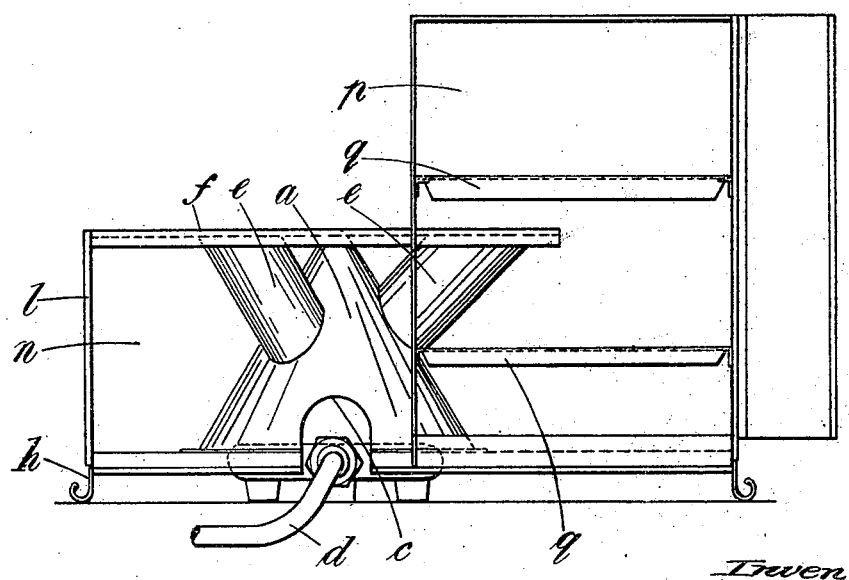

UNITED STATES PATENT OFFICE.

GEORGE WAITE, OF BEXHILL-ON-SEA, ENGLAND.

GAS COOKING-STOVE AND LIKE HEATER.

1,374,046.    Specification of Letters Patent.    Patented Apr. 5, 1921.

Application filed November 30, 1920. Serial No. 427,374.

*To all whom it may concern:*

Be it known that I, GEORGE WAITE, subject of the King of Great Britain, residing at 25ª Belle Hill, Bexhill-on-Sea, Sussex, England, have invented certain new and useful Improvements in Gas Cooking-Stoves and like Heaters, of which the following is a specification.

This invention relates to domestic and commercial heaters and particularly to domestic gas cooking stoves and has for its object to provide an improved and simple device which can be placed on existing gas rings to increase the amount of heat and so enable cooking and the like to be effected in much less time than heretofore.

The present gas cooker consists of a ring having a number of gas jets at the top and a number of upstanding projections on which to stand the cooking utensil.

According to this invention a cone or dome of metal or other suitable material is placed over the gas ring or the like to collect the heat from the gas jets, said cone or dome being formed with one or more tubes or flues to convey heat to a plate or the like provided on the upper extremities of the said tubes.

One or more of the tubes may be connected to a closed in container so that said container may serve as an oven or griller.

In order that the invention may be fully understood it will now be described with reference to the accompanying drawings in which Figure 1 is a side elevation of one form of gas cooking stove or heater constructed in accordance with this invention; Fig. 2 is a plan thereof and Figs. 3 and 4 are side elevations of modified constructions.

The cooking stove or heater as illustrated in Figs. 1 and 2 consists of a metal cone $a$, open at its base, which is riveted to a metal base plate $b$ having an opening cut in it of a size equal to the base of the cone.

An opening $c$ for the gas supply tube $d$ is also cut in the side of the cone. $e, e, e$ are three tubes suitably connected to the cone $a$ and plate $f$, suitable apertures being formed in the cone and plate for heat to pass from inside the cone to the top of the plate. The apertures in the top of the plate may be closed by means of slides $g, g, g^1$.

The plate $f$ is common to the three tubes $e, e, e$.

The base plate $b$ is sustained on a suitable support by means of feet $h, h$ so that plates and the like may be placed thereunder.

The slide $g^1$ is arranged to move in guides $j, j$ while the slides $g, g$ move about pivots $k, k$.

$l, n$ are side and back plates respectively.

It will be seen that in this example three separate cooking utensils can be placed on the plate $f$ either for boiling or frying but any suitable number of radiating tubes may be employed.

Referring to Fig. 3, a rectangular chamber $m$ provided with a door $o$ is fitted over one of the tubes $e$ so that food may be placed therein to be grilled and toasted. This chamber is of small height so that the heat coming up the tube strikes the top of the chamber and is deflected downward as illustrated by the arrows.

In this construction of heater, boiling or frying, grilling or toasting can take place at the same time from the one gas ring.

Referring now to Fig. 4, an oven $p$ provided with the usual shelves $q$ is fitted over one of the tubes $e$ so that roasting or baking may take place in addition to boiling and such like on the plate $f$. Utensils may also be placed on the top of the oven.

If it is not desired to use all the tubes $e$ those not required may be closed by the slides $g, g^1$; also the heat in the oven may be regulated by the slide $g^1$.

The oven or griller may be made detachable.

Instead of a plate common to all of the tubes $e, e, e$ a separate plate may be fitted at the top of each tube.

A heater constructed in accordance with this invention can be used in any room where there is a gas supply. When the gas is lighted the heat will drive to the top of the cone and distribute itself through the tubes to the various cooking utensils.

What I claim is:—

1. A gas cooking or heating apparatus comprising a hollow cone, open at top and bottom, adapted to be set over a ring burner to receive and conduct heat therefrom, and having a plurality of open tubes diverging upwardly and outwardly therefrom, and means for opening and closing said cone and tubes.

2. A cooking or heating apparatus comprising a hollow cone, open at top and bottom, adapted to be set over a ring burner to receive and conduct heat therefrom, and having a plurality of open tubes diverging upwardly and outwardly therefrom, means for opening and closing said cone and tubes, and a heating chamber associated with said cone and adapted to receive heat from one of said tubes.

In testimony whereof I have hereunto set my hand in presence of two subscribing witnesses.

GEORGE WAITE.

Witnesses:
 NEVILLE E. BROOKES,
 ERNEST J. HILL.